United States Patent [19]

Blaha et al.

[11] Patent Number: 5,110,092

[45] Date of Patent: May 5, 1992

[54] COMBINATION PULLER AND FISH TAPE REEL

[75] Inventors: William E. Blaha, St. Charles; Richard R. Hyde, DeKalb, both of Ill.

[73] Assignee: Ideal Industries, Sycamore, Ill.

[21] Appl. No.: 587,779

[22] Filed: Sep. 24, 1990

Related U.S. Application Data

[63] Continuation-in-part of Ser. No. 475,754, Feb. 6, 1990, abandoned.

[51] Int. Cl.⁵ ............................................. B65H 59/00
[52] U.S. Cl. ............................................. 254/134.3 FT
[58] Field of Search ............... 254/134.3 R, 134.3 FT, 254/245, 250, 254, 256, 259; 294/113, 114, 99.1, 1.1, 171; 15/104.31, 104.33, 143 R; 242/96, 85.1

[56] References Cited

U.S. PATENT DOCUMENTS

| | | | |
|---|---|---|---|
| 1,413,690 | 4/1922 | Slocum . | |
| 1,699,005 | 1/1929 | McLean | 294/99.1 |
| 1,844,433 | 2/1932 | Markowitz | 254/134.3 FT |
| 2,736,532 | 2/1956 | Hughes | 254/134.3 FT |
| 3,149,367 | 9/1964 | Dills | 294/171 |
| 3,312,128 | 4/1967 | Wasson . | |
| 3,424,038 | 1/1969 | Smith | 254/134.3 FT |
| 3,486,684 | 12/1969 | Dills et al. | 294/171 |
| 3,557,483 | 1/1971 | Wilson | 242/96 |
| 3,635,382 | 1/1972 | Wilson | 244/17 |
| 4,092,780 | 6/1978 | Trethewey et al. | 254/134.3 FT |
| 4,410,084 | 10/1983 | Ladner | 242/96 |
| 4,429,839 | 2/1984 | Jessamine | 242/96 |
| 4,431,144 | 2/1984 | Foster | 242/96 |
| 4,602,763 | 7/1986 | Gaylin | 294/99.1 |
| 4,819,911 | 4/1989 | Cielker . | |
| 4,829,999 | 5/1989 | Auth . | |

Primary Examiner—Robert C. Watson
Attorney, Agent, or Firm—Kinzer, Plyer, Dorn, McEachran & Jambor

[57] ABSTRACT

This is concerned with a fish tape puller and is in the nature of a gripping mechanism that can be used and operated by hand to enable an electrician or the like to get a better grip on fish tape. The device also has the advantage that it is structured to be stored in the opening of a conventional fish tape reel. The device is also in the nature of a puller which may be used to grasp and pull fish tape that is round in cross section or flat or ribbon-like. As well the device may be used to grasp and pull the wires themselves. The invention is also a combination of fish tape reel which has an opening in the center thereof and a puller which may be inserted in the center and removably held therein for transport and handling.

6 Claims, 2 Drawing Sheets

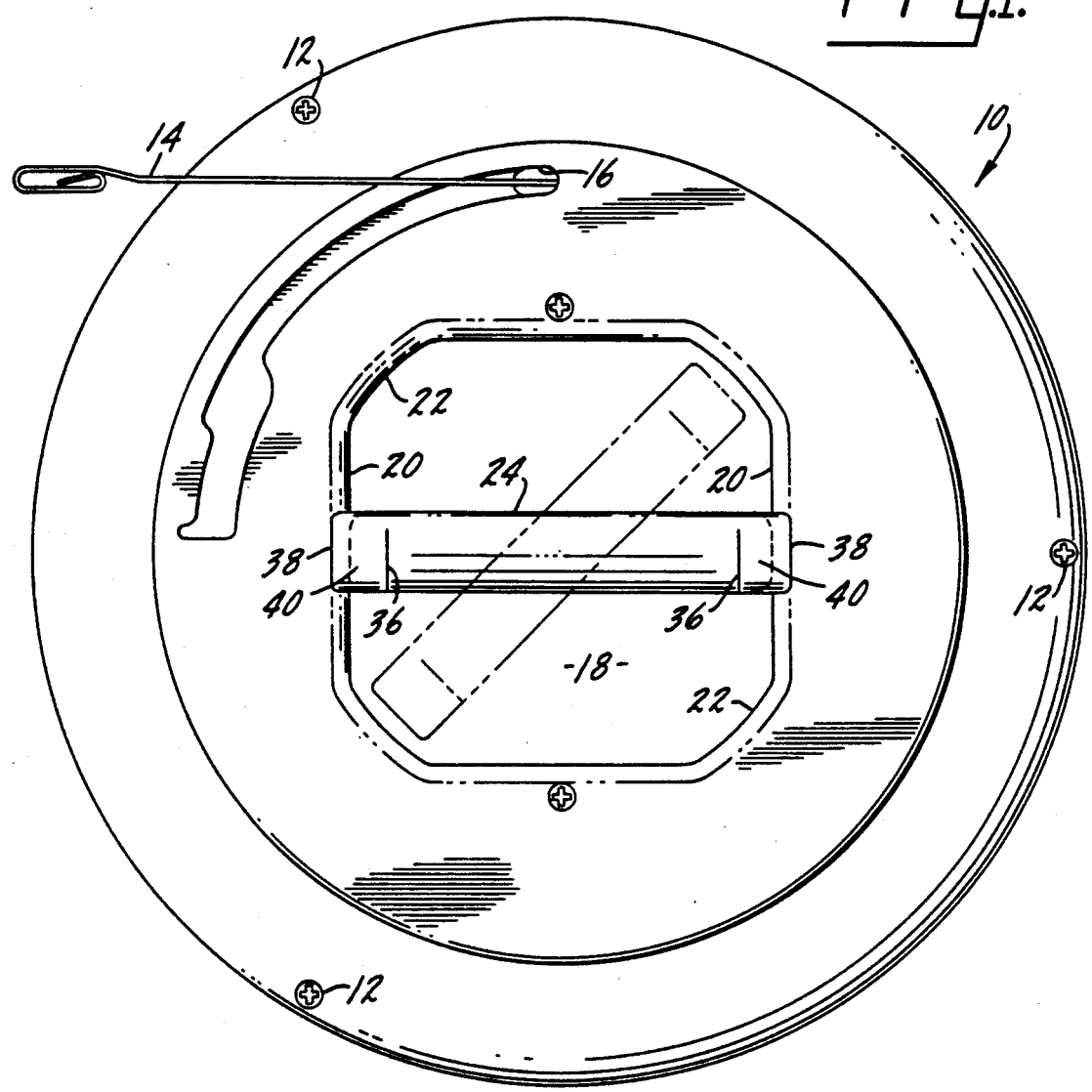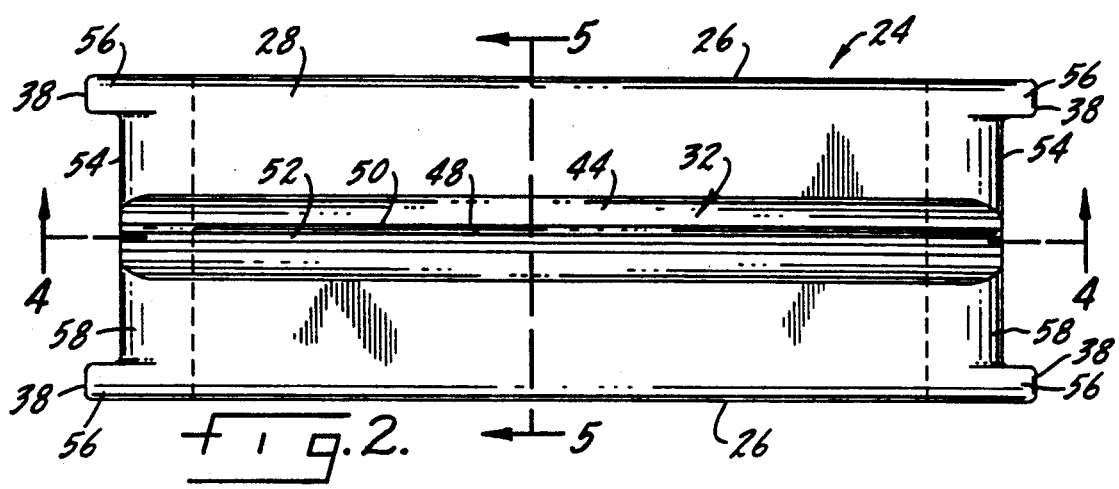

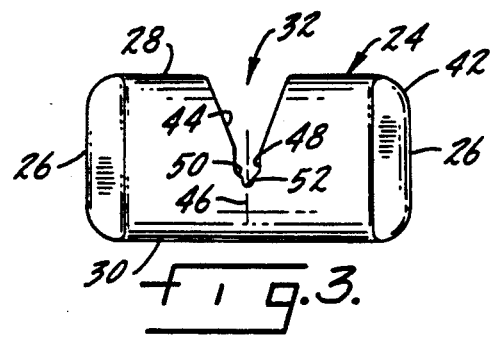
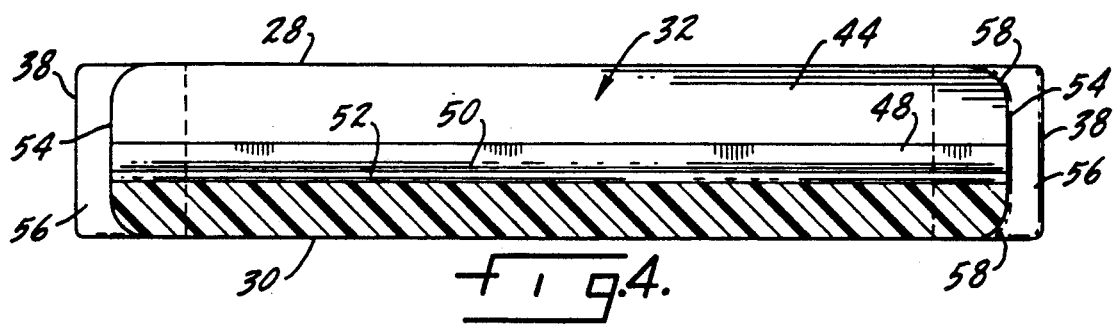
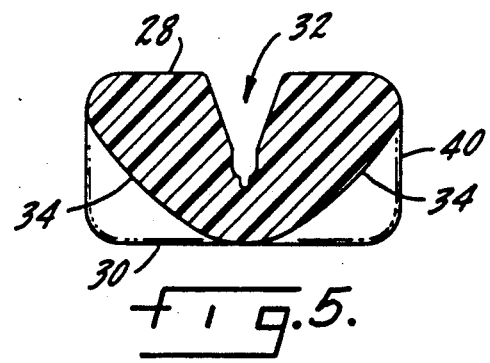

COMBINATION PULLER AND FISH TAPE REEL

This is a continuation-in-part of application Ser. No. 07/475,754 filed on Feb. 6, 1990 now abandoned.

SUMMARY OF THE INVENTION

This invention is concerned with a puller and is in the nature of a flexible gripping device which enables the user to get a better grip on fish tape and the like and, at the same time, saves wear and tear on the hands of the operator.

A primary object of the invention is a puller which is inexpensive to manufacture and enables the electrician or user to get a good grip on fish tape which may be slippery.

Another object is a puller which will get a good grip on fish tape even if it is coated with a lubricant.

Another object is a fish tape puller which is specifically constructed to cooperate and get a good grip on a lubricant coated fish tape.

Another object is a puller which may be constructed to fit or be usable with any standard size fish tape.

Another object is a fish tape puller which is constructed to be stored in the opening of a fish tape reel.

Another object is a puller device which may be used to grasp and pull fish tape which is round in cross section or flat ribbon-type fish tape.

Another object is a puller structure which may be used to grasp and pull the wires themselves.

Other objects will appear from time to time in the ensuing specification and drawings

BRIEF DESCRIPTION OF THE DRAWINGS

FIG. 1 is a side view of a fish tape reel with the fish tape puller stored therein;

FIG. 2 is a top view of the fish tape puller itself;

FIG. 3 is an end view of FIG. 2;

FIG. 4 is a section along line 4,4 of FIG. 2; and

FIG. 5 is a section along line 5,5 of FIG. 2.

DESCRIPTION OF THE PREFERRED EMBODIMENTS

In FIG. 1 a fish tape reel is indicated generally at 10 which may be two sides joined together by screws 12 or the like at suitable intervals with a fish tape 14 extending through an opening 16 in the side thereof and constructed to be wound inside of the fish tape reel, for example as shown in co-pending application Ser. No. 07/460,377, filed Jan. 3, 1990, and assigned to the assignee hereof. A fish tape reel of this general type is also shown in U.S. Pat. No. 3,549,127 issued Dec. 22, 1970 and assigned to the present assignee.

Fish tape reels commonly have a center opening such as at 18 in FIG. 1 which may be made up of a plurality of more or less straight sides 20 so that it has a generally square appearance with curved corners as at 22 all of which is shown in more detail in Ser. No. 07/460,377), filed Jan. 3, 1990, and also U.S. Pat. No. 3,549,127, both referred to above.

As shown in FIGS. 2-5, the fish tape puller of this invention is in the nature of an elongated body member indicated generally at 24 which, as shown in FIG. 1 and explained in detail hereinafter, is constructed and arranged to fit in the center opening of a fish tape reel for storage when it is not in use.

The puller itself as shown in FIG. 3 has two sides 26, a top surface 28 and a bottom surface 30 when viewed on end.

The upper surface has an elongated groove or channel 32 which will be explained in detail later. The side and bottom surfaces are removed, relieved or arced as at 34 for a certain distance between the ends and with a certain contour as explained later. The relieving or arcing terminates as at 36 at each end in spaced relation to the end walls 38 so the portion 40 in between will have the shape shown in FIG. 3. It will be noted that all four corners of the end as shown in FIG. 3 are rounded as at 42. The particular arcing or contouring 34 between the ends 40 is shaped to fit the hand of the user so that either the left or the right hand of the normal or average electrician will accept the device comfortably and inward pressure can be applied to flex or close the longitudinal channel 32 as explained hereinafter.

The channel 32 includes an initial entrance area 44 which may be made up of straight walls which converge or diverge at a given angle, for example 40° and is more or less symmetrical on each side of a longitudinal center plane 46. Toward the included end converging walls 44 are formed into generally parallel walls 48 which then merge into a semi-circular channel 50 swung on an appropriate radius. This is followed by a groove 52 which is substantially smaller than the spacing between walls 48 and the radius of curves 50.

As shown in FIG. 2, each of the end walls 54 are recessed or relieved for a certain distance so that projections 56 are provided with a certain spacing in between with appropriate rounding 58 where the body of the device merges into the end wall or a relieving.

The use, operation and function of the invention are as follows.

This fish tape puller is made of a suitable distortable or compressible material so that when the user fits his hand around the contoured formations 34, it can be compressed so as to close or tend to close the longitudinal groove 32. The material should be sufficiently flexible such that the average user, such as an electrician, will have no difficulty in closing the longitudinal groove 32 sufficiently to grasp a fish tape placed therein. At the present, the device is being made of a flexible material known as Alcryn 206MC present sold by E. I. DuPont & Company, but other materials are available and would serve adequately. The material of the fish tape puller should be an elastomeric or thermoplastic material which is normally known as a melt processable rubber or a thermoplastic rubber. It normally has durometer of about 60 which is the A-scale durometer but it may vary therefrom. It has a high coefficient of friction and an affinity for nylon.

The spacing between the walls 48 at the bottom of the groove is such that a known type of fish tape will fit therein, conform to the bottom rounding 50 and the bend will be tightly grasped when the sides are compressed. When the device is in its relaxed or free state the dimensioning is such that the fish tape may be easily inserted or withdrawn from the bottom of the slot. The present device is structured to accept and be operative with so-called S-class all plastic fish tape presently manufactured and sold by Ideal Industries, Inc., the assignee hereof.

One of the problems in getting a good grip on fish tape that it is normally covered with a lubricant which is necessary and desirable to enable the fish tape to be pushed or threaded through conduit which may be ½, ¾ or 1"in diameter and may have a number of 90° turns. The result is that it will be slick and electricians are obligated to wear gloves and to use various types of pulling devices none of which work adequately. In many cases this will result in damage to the fish tape when an electrician tries to use a pair of pliers or the like to get a good grip on the fish tape. With the present device the fish tape can be easily fitted in the bottom of the groove or opening between walls 48 and nestled in arc 50. Then the user can compress the sides by squeezing the contoured surfaces 34. The small channel 52 directly below the fish tape serves as an escape or release or repository for lubricant which will be squeezed off of the sides of the fish tape so that a better grip will be obtained on the fish tape.

When the device is not in use, it may be stored in the center opening in a fish tape reel such as shown in FIG. 1. It will be noticed that the diagonal distance where the fish tape puller is shown in dotted lines in FIG. 1 is greater between the arcs 22 than the distance of the overall length of the fish tape puller so that it can be inserted into the opening. It is then rotated about 45° between two of the straight side walls where the distance is less and the end walls 54 at each end of the puller will fit snugly between the flat walls 20 of the opening in the fish tape reel with the extensions 56 on each corner of the fish tape puller fitting on each side of the reel body as shown in FIG. 1 so that the unit will stay in place. The distance between the end walls 54 is slightly greater than the distance between the sides 20 of the opening in the fish tape so that a snug fit is provided. And a slight interference fit here ca be accommodated because the device is flexible and the degree of interfit should be such that the fish tape puller will not fall out easily. Further, when the fish tape puller is securely mounted in the center of the fish tape reel, it can be used as a handle so that the combination can be carried by the electrician.

Whereas the device has been referred to as a fish tape puller and is shown as having a center opening for use with a fish tape having a round cross section, such as S-CLASS presently manufactured and sold by Ideal Industries, Inc. of Sycamore, Ill., it should be understood that the device may also be used to grasp flat metal ribbon-like fish tape, such as shown in U S. Pat. No. 3,424,435 issued Jan. 28, 1969. It should be also understood that the device may be used to grasp the wire or wires themselves.

While the device has been shown mounted in the somewhat square center opening of a fish tape reel, it should be understood that in certain situations it might be mounted in a fish tape reel having a round center opening, such as shown in U.S. Pat. No. 2,788,952 issued Apr. 16, 1957 or an irregular opening such as shown in U.S. Pat. No. 3,601,330 issued Aug. 24, 1971. While the expression fish tape puller and the like has been frequently used herein and in the claims, this should not be given a limiting interpretation but rather is merely indicative or representative of the function or purpose of the device.

While the preferred form and several variations of the invention have been shown, described, and suggested, it should be understood that suitable additional modifications, changes, substitutions and alterations may be made without departing from the invention's fundamental them. It is therefore wished that the invention be unrestricted except as by the appended claims.

The embodiments of the invention in which an exclusive property or privilege is claimed are defined as follows:

1. In a puller structure for gripping and pulling an elongated object, such as a fish tape or the like to aid in pulling the elongated object through a conduit and the like, a somewhat elongated body structure divided into opposed otherwise solid side formations separated by a longitudinal channel opening on a top surface of the body structure, the distance between the bottom of the channel and a bottom surface of the body structure being such that a hinge is provided between the two side formations, a reception cavity in the longitudinal channel for an elongated object, such as a fish tape to be gripped and pulled, the body being made primarily of a stiffly flexible plastic of sufficient flexibility to allow the hinge to be flexed and the side surfaces to approach each other closing the channel somewhat under compression on the outside of the puller structure by the human hand, the size and dimensioning being such that an elongated object may be easily inserted or withdrawn from the bottom of the reception cavity when the puller structure is in its free state, and a mounting formation on each end of the body structure enabling the puller structure to be releasably mounted in the central opening of an electrician's fish tape reel, the mounting formation of each end including a pair of laterally spaced longitudinally disposed projections defining a recessed flat between them, the flats on each end being separated from each other by a distance on the order of the distance between the opposed surfaces forming the inner openings in a fish tape reel.

2. In a combination fish tape reel and fish tape puller structure, a fish tape reel having a generally annular case with an exit for a fish tape, a non-round opening in the center of the case having at least two different dimensions, one greater than the other providing at least two pairs of opposed surfaces, a fish tape puller having a generally elongated body with lateral surfaces at each end, a mounting formation on each of the end surfaces constructed and arranged to fit in the non-round opening of the fish tape reel when the puller is mounted therein, the space relationship between the length of the puller and the pair of opposed surfaces of the opening being such that the puller is shorter than the distance between one pair of opposed surfaces and is on the order of the same length as the distance between the other pair of opposed surfaces.

3. The structure of claim 2 in which the mounting formation includes a pair of laterally spaced longitudinally disposed projections defining a recessed flat between them, the flats on each end being spaced from each other by a distance on the order of the distance between the other pair of opposed surfaces of the opening in the fish tape reel.

4. The structure of claim 3 in which the distance between the spaced flats on the ends of the fish tape puller is slightly greater than the distance between the other pair of opposed surfaces of the opening in the fish tape reel so that a snug fit is provided when the fish tape puller is mounted in the center opening of the fish tape reel.

5. In a combination fish tape reel and puller structure, a fish tape reel having generally annular case with an opening in the center thereof, and an elongated puller structure removably mounted in the opening in the center of the case, the puller structure having mounting formations on each end thereof constructed and arranged to releasably engage the opening in the center of the fish tape reel.

6. The structure of claim 5 further characterized in that the opening in the center of the reel in non-round and has at least two diametrical dimensions, one greater than the other.

* * * * *